Jan. 27, 1942.  C. HARRIS  2,271,425
COUPLING
Filed Feb. 10, 1940
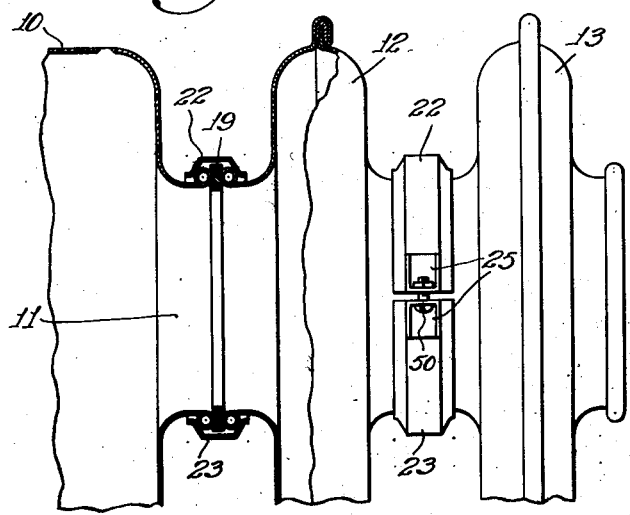
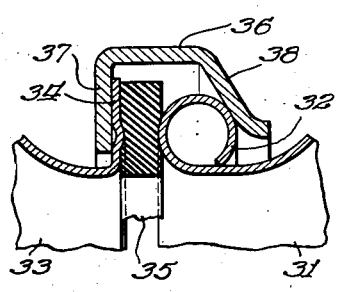
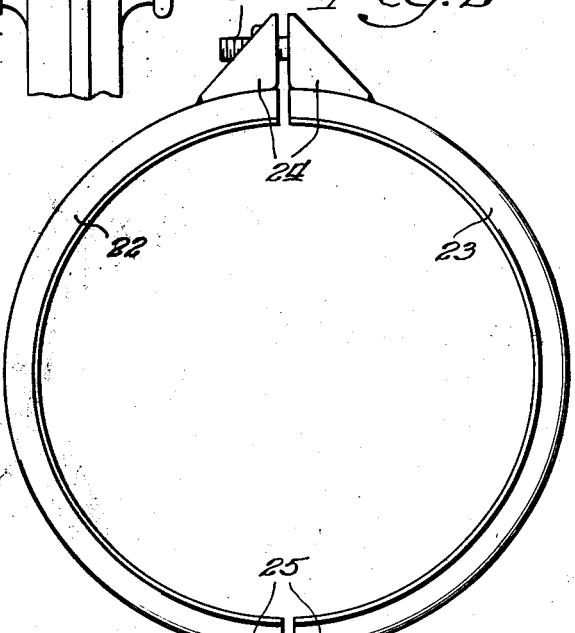
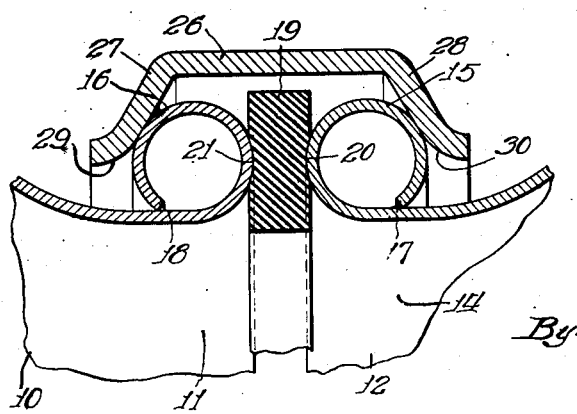
Inventor:
Cleo Harris
By: Edward C. Fritzbaugh
Atty.

Patented Jan. 27, 1942

2,271,425

UNITED STATES PATENT OFFICE 2,271,425

COUPLING

Cleo Harris, Kalamazoo, Mich., assignor to Borg-Warner Corporation, Chicago, Ill., a corporation of Illinois Application February 10, 1940, Serial No. 318,209

2 Claims. (Cl. 285—129)

This invention relates to couplings for containers, conduits, etc. for fluid and particularly to couplings for connecting adjacent containers wherein the joints between the containers must be gas-tight.

The object of this invention is to provide a coupling for containers, pipes, and the like, which are made from relatively thin stock, the coupling being effective to make the joints between adjacent containers gas-tight.

Another object of this invention is to provide a coupling wherein a gasket is used and wherein resilient means are provided for compressing the gasket to form a gas-tight joint.

These and other objects and features of the invention will become apparent from the following description when taken together with the accompanying drawing which forms a part thereof, and in which:

Fig. 1 is a fragmentary elevation, partly in section, of an adaptation of this invention wherein the coupling is used to connect sections of a gas-fired heating unit together;

Fig. 2 is a side elevation of a clamping ring which forms a part of the coupling;

Fig. 3 is an enlarged fragmentary elevation in section of the novel coupling; and Figs. 4 and 5 are modifications of the coupling shown in Fig. 3 and embodying the same principles.

Briefly, the novel coupling comprises resilient curled elements or flanges at adjacent ends of the containers to be coupled, a compressible gasket between the curled elements, and a split clamping ring embracing the curled elements and adapted to contact oppositely sloping portions of the curled elements to deform the elements and thereby exert a compressive force upon the gasket to form a gas-tight seal.

Referring to the drawing now for a detailed description of the invention, 10 is a sheet metal combustion chamber for a gas burning furnace having an opening 11 through which the products of combustion may escape. In order to extract the maximum amount of heat from the products of combustion, radiators 12 and 13 are coupled to combustion chamber 10 and the products of combustion are made to pass therethrough. Radiators 12 and 13 are likewise formed from sheet metal. The air surrounding the combustion chamber 10 and the radiators 12 and 13 is, of course, passed through ducts (not shown) to the rooms to be heated. Obviously, the leakage of noxious gases into the ducts from the joints would be dangerous, and consequently, the joints must be absolutely tight.

Referring now to Fig. 3 for the details of the coupling, the portion 14 of radiator 12 and the portion of combustion chamber 10 which define the passageway 11 through which the products of combustion flow, are formed at their ends with flanges 15 and 16. These flanges are in the form of closed loops, that is, the edges 17 and 18 of flanges 15 and 16, respectively, are curled over until they contact the outside of the opening-defining portion of the combustion chamber and radiator. The reason for this shape is to prevent further curling of the metal when it is subjected to radial pressure. Such curling might result in a separation of the flanges instead of a movement toward one another, and hence would defeat the purpose of the coupling. By forming closed loops, further curling under operating conditions is prevented. Between flanges 15 and 16 is located an annular gasket 19 made of asbestos or other heat-resistant material. Gasket 19 possesses a certain amount of resilience so that it can be compressed between the flanges to take care of irregularities in the contacting surfaces, and yet will exert the necessary reactive spreading force thereupon.

It will be observed that the shape of flanges 15 and 16 is such that they likewise possess a certain amount of resilience and yet at the same time are stiff enough, despite the thinness of the stock from which they are made, to withstand the pressure to which they must be subjected in order to form a gas-tight joint. It will also be observed that the circular contour of the flanges results in a concentration of the compressive force over relatively small areas of contact 20 and 21 on gaskets 19. This further promotes the gas-tight qualities of the coupling.

Embracing flanges 15 and 16 and gasket 19 is a split clamping ring which is shown in Fig. 2. This ring is comprised of sections 22 and 23 made from relatively stiff material. In the form shown in Figs. 2 and 3, each section is provided with clamping lugs 24 and 25, which are welded to the ends of the sections. Each section is slightly less than semi-circular in extent so that they may be drawn tightly together by means of bolts 50.

In cross-section, the clamping ring resembles a channel iron having sloping sides or flanges. As shown in Fig. 3, the ring is comprised of a flat portion 26 and radially inwardly sloping flanges 27 and 28, each of which is curled outwardly at its edge. This results in curved surfaces 29 and 30 on flanges 27 and 28. Sloping flanges 27 and 28 form conical surfaces which contact opposite sides of curled flanges 15 and 16. It will be apparent that when clamping ring sections 22 and 23 are drawn together, the conical surfaces on the ring coact with the curved surfaces of flanges 15 and 16 to exert a compressive force upon the said flanges 15 and 16, which in turn is transmitted to gasket 19. The more tightly bolts 50 bear upon clamping lugs 24 and 25, the greater the compressive action exerted upon gasket 19.

Curved surfaces 29 and 30 serve to start the clamping rings over the flanges, and the outturned edges serve additionally to stiffen flanges 27 and 28.

Fig. 4 shows a modification of the coupling of Fig. 3. In this modification a container 31 has a curled flange 32 formed at one end thereof and container 33 has a beaded radial flange 34 at its adjacent end. A gasket 35 of heat-resistant and compressible material similar to that of gasket 19 is inserted between flanges 32 and 34. A split clamping ring 36 embraces flanges 32 and 34, said ring 36 having a radial flange 37 bearing against flange 34, and a conical flange 38 cooperating with curled flange 32 to exert a compressive force upon gasket 35. Thus, in this modification, just one curled flange and one conical flange are used and in some cases this will be sufficient.

Fig. 5 shows another modification wherein the curled and conical flanges are interchanged. Containers 39 and 40 are formed at their adjacent ends with conical flanges 41 and 42, respectively, the ends 43 and 44 of which are bent outwardly to reduce the area of contact with gasket 45 and also to stiffen said ends. Clamping ring 46 is provided with curled depending flanges 47 and 48 which bear upon conical flanges 41 and 42, respectively. It will be apparent that as ring 46 is clamped upon flanges 41 and 42, a compressive force will be exerted as in the preceding forms upon gasket 45 to form a gas-tight joint.

It is understood that other modifications may suggest themselves to those skilled in the art, each of which modifications embodies the inventive thought described hereinabove. The constructions illustrated result in couplings which are inexpensive, which are adapted to cooperate with flanges formed from relatively thin material, but which nevertheless, are effective to seal the joint against leakage of gas. The resilience in the curled flange is made use of to maintain the tightness of the joint, and at the same time, provides a means for translating a radial force into an axial compressive force.

It is understood further that the foregoing description is merely illustrative of the preferred embodiments of the invention, and that the scope of the invention, therefore, is not intended to be limited thereto, but is to be determined by the appended claims.

I claim:

1. A coupling for fluid containers comprising opposed flanges on the containers, a clamping ring bridging said flanges, depending flanges on said ring cooperating with the opposed flanges on the containers, and a compressible gasket between the opposed flanges, the flanges on the containers comprising outwardly curled closed loops such that radially inward eccentric pressure on the loops will tend to move the loops axially, and the flanges on the ring being substantially conical, and means for clamping the ring upon the loops to exert such inward eccentric pressure upon the loops whereby to cause the loops to exert a compressive force upon the gasket to form a fluid-tight seal.

2. A coupling for fluid containers comprising a curled flange on the end of one container, a substantially radial flange on the end of the adjacent container, a compressible gasket between the flanges, and a clamping ring embracing the flanges and adapted to exert a compressive force thereupon to compress the gasket and form a fluid tight seal, said ring having a substantially radial flange cooperating with the radial container flange, and a conical flange cooperating with the curled flange.

CLEO HARRIS.